(12) United States Patent
Boshoff

(10) Patent No.: US 11,297,956 B2
(45) Date of Patent: Apr. 12, 2022

(54) ORTHOPEDIC BABY SEAT

(71) Applicant: Lizhan Boshoff, Bethlehem (ZA)

(72) Inventor: Lizhan Boshoff, Bethlehem (ZA)

(73) Assignee: Lizhan Boshoff

( * ) Notice: Subject to any disclaimer, the term of this patent is extended or adjusted under 35 U.S.C. 154(b) by 0 days.

(21) Appl. No.: 17/040,356

(22) PCT Filed: Mar. 26, 2019

(86) PCT No.: PCT/ZA2019/000003
§ 371 (c)(1),
(2) Date: Sep. 22, 2020

(87) PCT Pub. No.: WO2019/191790
PCT Pub. Date: Oct. 3, 2019

(65) Prior Publication Data
US 2021/0022523 A1     Jan. 28, 2021

(30) Foreign Application Priority Data
Mar. 26, 2018  (ZA) .................... 2018/01970

(51) Int. Cl.
*A47D 1/10* (2006.01)
*A47D 1/00* (2006.01)
(Continued)

(52) U.S. Cl.
CPC ............ *A47D 1/10* (2013.01); *A47D 1/002* (2013.01); *A47D 13/025* (2013.01);
(Continued)

(58) Field of Classification Search
CPC ........ A47D 1/10; A47D 1/002; A47D 13/025; A47D 13/043; A47D 13/107; A47D 15/006; A47D 13/083; A47D 1/106; B60N 2/28
(Continued)

(56) References Cited

U.S. PATENT DOCUMENTS 159,639 A * 2/1875 Burgess ................ F16M 11/10
248/371
1,176,048 A   3/1916 Gentilella
(Continued)

FOREIGN PATENT DOCUMENTS

CN   202 354 957 U   8/2012
KR   101 387 668 B1  4/2014

OTHER PUBLICATIONS

International Search Report with Written Opinion of the International Searching Authority, dated Jun. 14, 2020, with respect to International Application No. PCT/ZA2019/000003.
(Continued)

*Primary Examiner* — Milton Nelson, Jr.
(74) *Attorney, Agent, or Firm* — Scott R. Cox

(57) ABSTRACT

An orthopedic baby seat including an inflexible base, having a triangular planar cushion, of a flexible support material, wherein the base tapers towards a front end in a substantially fish-tail-shaped planar configuration. The base is configured to receive and support a baby's bottom. The seat further includes a back support, extending upwardly from and at least partially around the base, in a C-formation and to a height of at least to a bottom of the baby's ribcage, with an opening of the C-formation directed towards the front of the seat. The back support includes at least one layer of a flexible sheet material, having a number of spaced, upwardly extending retaining formations, and a number of elongated battens, retained by the retaining formations and extending longitudinally upwardly from the base, providing a rigid, vertically, and flexible lateral support to a baby.

14 Claims, 5 Drawing Sheets

(51) Int. Cl.
*A47D 13/02* (2006.01)
*A47D 13/04* (2006.01)
*A47D 13/08* (2006.01)
*A47D 13/10* (2006.01)
*A47D 15/00* (2006.01)
*B60N 2/28* (2006.01)

(52) U.S. Cl.
CPC ......... *A47D 13/043* (2013.01); *A47D 13/083* (2013.01); *A47D 13/107* (2013.01); *A47D 15/006* (2013.01); *B60N 2/28* (2013.01)

(58) Field of Classification Search
USPC .................. 297/273, 274, 5, 452.63, 452.4
See application file for complete search history.

(56) References Cited

U.S. PATENT DOCUMENTS

| | | | | |
|---|---|---|---|---|
| 1,390,502 A | * | 9/1921 | Clouser | A47D 13/107 |
| | | | | 297/276 |
| 1,428,039 A | * | 9/1922 | Kratz | A47K 3/127 |
| | | | | 297/130 |
| 1,455,239 A | * | 5/1923 | Childress | A47C 7/425 |
| | | | | 297/452.42 |
| 1,965,236 A | * | 7/1934 | Hall | A47D 13/107 |
| | | | | 248/581 |
| 5,890,769 A | * | 4/1999 | Fairbanks | A47D 15/006 |
| | | | | 297/467 |
| 8,104,780 B1 | * | 1/2012 | McConnell-Copploe | |
| | | | | A61H 3/008 |
| | | | | 280/87.051 |
| 8,262,157 B2 | * | 9/2012 | Novak | A47C 1/146 |
| | | | | 297/16.2 |
| 10,016,065 B1 | * | 7/2018 | Vaishnav | A47D 13/025 |
| 2012/0018971 A1 | | 1/2012 | You et al. | |
| 2015/0042058 A1 | | 2/2015 | Sejnowski et al. | |

OTHER PUBLICATIONS

Badihian Sh, Badihian N, Yaghini O. The Effect of Baby Walker on Child Development: A Systematice Review. Iran J Child Neurol. Autumn 2017; 11(4):1-6.

Christin H Krey; Special seating considerations for the child with a spinal cord injury: International Journal of Therapy and Rehabilitation, Feb. 2005, vol. 12, No. 2.

Pages 2-7 of Hip Health in Baby Carriers, Baby Seats, and Other Equipment International Hip Dysplasia Institute Article dated Jan. 22, 2018 posted at https://hipdysplasia.org/developmental-dysplasia-of-the-hip/prevention/baby-carriers-seats-and-other-equipment/.

* cited by examiner

ORTHOPEDIC BABY SEAT

FIELD OF THE INVENTION

The invention relates to an orthopedic baby seat with ergonomic features for use in baby equipment.

BACKGROUND TO THE INVENTION

Various types of equipment for use in holding, carrying, transporting, feeding and generally securing babies exist. These types of equipment include so-called baby harnesses, slings, carriers, wraps, pouches, jumpers, swings, rockers, bouncers, walkers, walking frames, seats, high chairs, clip-on chairs, car seats and the like.

The baby seats or sitting arrangements in these types of equipment generally offer little or no proper or orthopedically sound, spine, hip, pelvis and/or posture support, typically focusing primarily on safety and cushioning only. The needs of the developing pediatric spine, hip and pelvis are therefore seldom if ever catered or provided for, and most if not all equipment fail in providing correct and sufficient support. In fact, in most cases the baby seats comprise either of a soft pouch, with very little support structure for sound pediatric development, or of a rigid molded framework with one or more layers of cushioning thereon.

The risk of professional liability also does not help to secure professional expertise in assisting developers with designing orthopedically sound baby seats, and most experts simply refrain from getting involved with or even endorsing pediatric designs. Orthopedic concerns, including hip positioning, bent and spread as well as spine, pelvis and thigh support are therefore given little attention during baby seat design. With babies having spent months within the womb, in the fetal position, in which both hips and knees are typically bent or flexed, it takes several months for the joints to stretch out naturally. The pediatric need therefore exist for proper baby support during those initial formative months outside the womb to protect babies from bad postural habits or even dysplasia, dislocation or permanent damage or deformations well as painful arthritis during adulthood.

Common positions in the existing equipment, including those wherein the legs are held in extension with the hips, knees kept straight and the legs brought together, opposite to the fetal position, are therefore risky and hence to be avoided. Similarly, positions wherein the hips are allowed to fall or spread (naturally) apart to the side, with the thighs supported and the hips and knees bent, are beneficial orthopedically to the babies and hence to be encouraged. Baby seats supporting these latter positions, also called jockey, straddle, frog, spread-squat or human positions, are therefore preferred. In addition thereto, seating arrangements allowing for free movement of the hips without forcing them together promote natural hip development, and are similarly to be encouraged. Conversely, molded seating configurations enforcing fixed spine, hip, and pelvis arrangements and/or posture support are to be avoided for the same reason.

OBJECT OF THE INVENTION

It is accordingly an object of the present invention to provide a novel, relatively inexpensive and orthopedically sound, adjustable baby seat for use in baby equipment.

SUMMARY OF THE INVENTION

According to a first aspect of the invention there is provided an orthopedic baby seat comprising:

a relatively inflexible base, having a substantially triangular planar cushion, of a resiliently flexible, support material, the cushioned base tapering towards a front end to provide a substantially fish-tail shaped planar configuration, the base being suitably dimensioned and configured to receive and support a baby's bottom thereon;

a back support, extending upwardly from and at least partially around the base, in a substantially C-formation and to a height of at least to the bottom of the baby's ribcage, with the opening of the C-formation directed towards the front of the seat, the back support comprising at least one layer of at least partially flexible sheet material, having a number of spaced, upwardly extending retaining formations, and a number of elongated battens, retained by the retaining formations and extending longitudinally upwardly from the base;

providing a substantially rigid, vertically, and flexible, laterally, support to a baby occupying the seat;

two opposing leg openings, extending outwardly from the base; and two opposed, cushioned thigh support formations, separating the base from the two leg openings and dimensioned and configured to allow the hips to fall and spread naturally apart to the side, with the thighs at least partially supported towards the knee joints and the hips and knees bent, allowing the legs to spread outwardly in a supported manner while moving relatively freely in the seat.

The orthopedic baby seat may be provided with at least one adjustable, resiliently flexible front fastener, dimensioned and configured to provide extra support and posture control to the baby's torso while fastening the baby securely in the seat, with due allowance for varying sizes, weights and/or physical proportions. Preferably, orthopedic baby seat is provided with two opposing, adjustable, resiliently flexible front fasteners, extending from the opposing ends of the substantially C-formation and elevated from the base so as to provide optimum support and posture control as well as secure fastening to babies of varying sizes, weights and/or physical proportions in the seat.

The orthopedic baby seat may be provided with at least one adjustable, resiliently flexible rear fastener, dimensioned and configured to set the width of the back support and hence the lateral support and posture control to a baby's size, weight and/or physical proportions in the seat.

The baby seat may be provided with securing formations for securing the seat to a secondary structure. The secondary structure may comprise equipment for use in holding, carrying, transporting, feeding and generally securing babies. The equipment preferably is selected from the group consisting of baby harnesses, slings, carriers, wraps, pouches, jumpers, swings, rockers, bouncers, walkers, walking frames, seats, high chairs, clip-on chairs, car seats and the like.

The back support may comprise two layers, at least one of which may comprise of resiliently flexible material. The back support may be provided with segments for additional ergonomic and deep pressure support. The resiliently flexible sheet material may comprise of an elastically flexible material and, preferably, of a synthetic rubber and, more preferably, of polychloroprene, or so-called closed-cell foamed Neoprene, FLA pediatric neoprene, or flexible poly/ cotton blends. The flexible sheet material may be provided with breathing openings to reduce heat buildup, sweating, shafting and the like.

The battens may be made of wood, fiberglass, vinyl, or carbon fiber, PVC, cast acrylic, nylon or light metal.

The back support may be provided with a padded upper edge formation, extending substantially along the upper edge of the support to provide protection to baby limbs, including neck, arms and the like.

According to a second aspect of the invention there is provided equipment for use in holding, carrying, transporting, feeding or securing babies, the equipment characterised in having an orthopedic baby seat comprising:

a relatively inflexible base, having a substantially triangular planar cushion, of a resiliently flexible, support material, the cushioned base tapering towards a front end to provide a substantially fish-tail shaped planar configuration, the base being suitably dimensioned and configured to receive and support a baby's bottom thereon;

a back support, extending upwardly from and at least partially around the base, in a substantially C-formation and to a height of at least to the bottom of the baby's ribcage, with the opening of the C-formation directed towards the front of the seat, the back support comprising flexible sheet material, having a number of spaced, upwardly extending retaining formations, and a number of elongated battens, retained by the retaining formations and extending longitudinally upwardly from the base;

providing a substantially rigid, vertically, and flexible, laterally, support to a baby occupying the seat;

two opposing leg openings, extending outwardly from the base; and two opposed, cushioned thigh support formations, separating the base from the two leg openings and dimensioned and configured to allow the hips to fall and spread naturally apart to the side, with the thighs supported towards the knee joints and the hips and knees bent, allowing the legs to spread outwardly in a supported manner while moving freely in the seat.

The orthopedic baby seat may be provided with at least one adjustable, resiliently flexible front fastener, dimensioned and configured to provide extra support and posture control to the baby's torso while fastening the baby securely in the seat, with due allowance for varying sizes, weights and/or physical proportions. Preferably, orthopedic baby seat is provided with two opposing, adjustable, resiliently flexible front fasteners, extending from the opposing ends of the substantially C-formation and elevated from the base so as to provide optimum support and posture control as well as secure fastening to babies of varying sizes, weights and/or physical proportions in the seat.

The orthopedic baby seat may be provided with at least one adjustable, resiliently flexible rear fastener, dimensioned and configured to set the width of the back support and hence the lateral support and posture control to a baby's size, weight and/or physical proportions in the seat.

The orthopedic baby seat may be provided with securing formations for securing the seat to the equipment. The equipment preferably is selected from the group consisting of baby harnesses, slings, carriers, wraps, pouches, jumpers, swings, rockers, bouncers, walkers, walking frames, seats, high chairs, clip-on chairs, car seats and the like.

The flexible sheet material may comprise of a elastically flexible material and, preferably, of a synthetic rubber, including polychloroprene, or so-called Neoprene. The flexible sheet material may be provided with breathing openings to reduce heat buildup, sweating, shafing and the like.

The battens may be made of wood, fiberglass, vinyl, or carbon fiber or light metal.

The back support may be provided with a padded upper edge formation, extending substantially along the upper edge of the support to provide protection to baby limbs, including neck, arms and the like.

DETAILED DESCRIPTION OF THE INVENTION

Preferred embodiments of the invention are described hereunder, with reference to the accompanying drawings, wherein.

Figure 1:
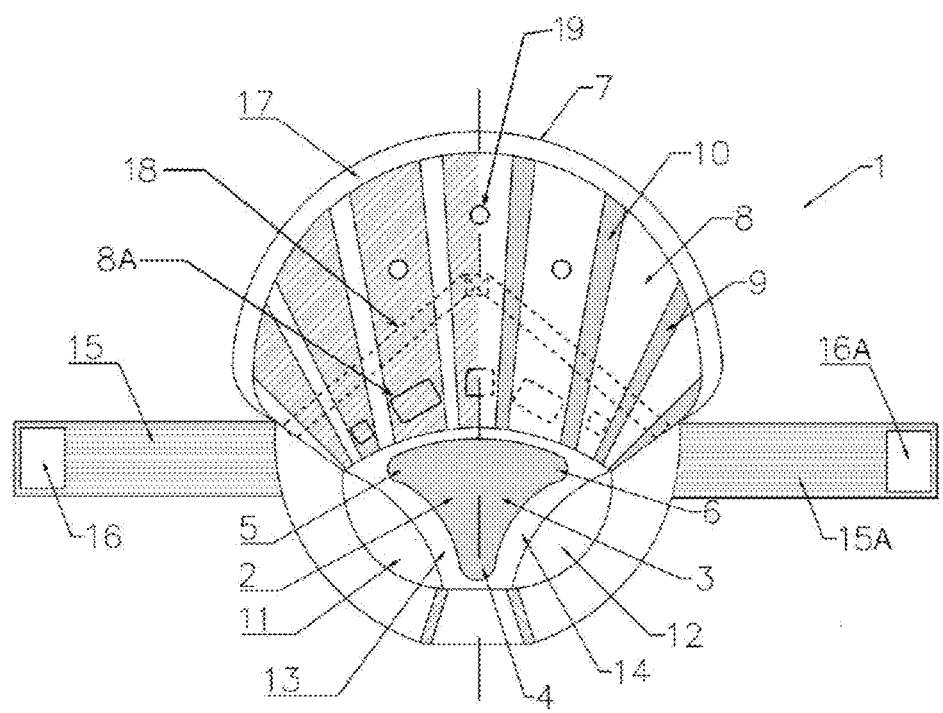
FIG. 1 is an orthopedic baby seat in accordance with the invention.

An orthopedic baby seat 1 as illustrated in FIG. 1 comprises a relatively inflexible base 2, having a substantially triangular planar cushion 3, of a resiliently flexible, support material, the cushioned base tapering towards a front end 4 to provide a substantially fish-tail shaped planar configuration, with two opposed, substantially similar, planar rear ends 5 and 6, the base being suitably dimensioned and configured to receive and support a baby's bottom (not shown) thereon; a back support 7, extending upwardly from and at least partially around the base, in a substantially C-formation and to a height of at least to the bottom of the baby's ribcage, with the opening of the C-formation directed towards the front of the seat, the back support comprising of two layers of flexible sheet material 8, having a number of spaced, upwardly extending retaining formations 9, in the form of sleeves, and a number of elongated battens 10, retained by the retaining formations and extending longitudinally upwardly from the base; providing a substantially rigid, vertically, and flexible, laterally, support to a baby occupying the seat; two opposing leg openings 11 and 12, extending outwardly from the base; two opposed, cushioned thigh support formations 13 and 14, separating the base from the two leg openings and dimensioned and configured to allow the hips (not shown) to fall and spread naturally apart to the side, with the thighs (not shown) supported towards the knee joints (not shown) and the hips and knees (not shown) bent, allowing the legs (not shown) to spread outwardly in a supported manner while moving freely in the seat; and an adjustable, resiliently flexible front fastener 15, dimensioned and configured to provide extra support and posture control to the baby's torso while fastening the baby securely in the seat, by means of a hook-and-loop fastener 16, or so-called VELCRO.

It is envisaged that the baby seat 1 could be provided with two opposing, adjustable, resiliently flexible front fasteners 15 & 15A, extending from the opposing ends of the substantially C-formation and elevated from the base 2 so as to provide optimum support and posture control as well as secure fastening to babies (not shown) of varying sizes, weights and/or physical proportions in the seat.

It is further envisaged that the orthopedic baby seat 1 could be provided with at least one adjustable, resiliently flexible rear fastener 18, dimensioned and configured to set the width of the back support 7 and hence the lateral support and posture control to a baby's size, weight and/or physical proportions in the seat.

The orthopedic baby 1 is provided with securing formations (not shown) for securing the seat to a secondary structure (not shown). It is envisaged that the secondary structure (not shown) could comprise of equipment for use in holding, carrying, transporting, feeding and generally securing babies.

The flexible sheet material 8 comprises of one layer of elastically flexible material in the form of a synthetic rubber, including polychloroprene, also known as Neoprene. It is envisaged that the flexible sheet material could be provided with breathing openings 19 to reduce heat buildup, sweating, shafing and the like. It is further envisaged that the back support 7 could be provided with segments for additional ergonomic and deep pressure support 8A.

The battens 10 are made of light metal. It is envisaged that the battens 10 can be made of any alternative material, including wood, fiberglass, vinyl or carbon fiber.

The back support 7 is provided with a padded upper edge formation 17, extending substantially along the upper edge of the support to provide protection to baby limbs, including its neck, arms and the like (not shown).

Figure 2:
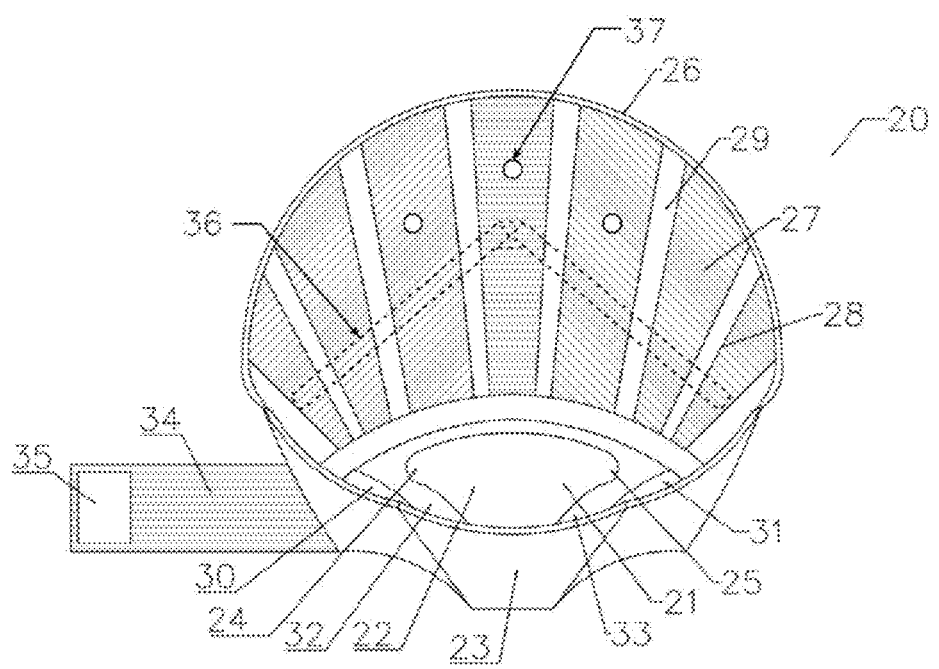
FIG. 2 is an alternative embodiment of an orthopedic baby seat in accordance with the invention.

An alternative embodiment of an orthopedic baby seat 20 in accordance with the invention and as illustrated in FIG. 2 comprises a relatively inflexible base 21, having a substantially triangular planar cushion 22, of a resiliently flexible, support material, the cushioned base tapering towards a front end 23 to provide a substantially fish-tail shaped planar configuration, with two opposed, substantially similar, planar rear ends 24 and 25, the base being suitably dimensioned and configured to receive and support a baby's bottom (not shown) thereon; a back support 26, extending upwardly from and at least partially around the base, in a substantially C-formation and to a height of at least to the bottom of the baby's ribcage, with the opening of the C-formation directed towards the front of the seat, the back support comprising flexible sheet material 27, having a number of spaced, upwardly extending retaining formations 28, in the form of sleeves, and a number of elongated battens 29, retained by the retaining formations and extending longitudinally upwardly from the base; providing a substantially rigid, vertically, and flexible, laterally, support to a baby occupying the seat; two opposing leg openings 30 and 31, extending outwardly from the base; two opposed, cushioned thigh support formations 32 and 33, separating the base from the two leg openings and dimensioned and configured to allow the hips (not shown) to fall and spread naturally apart to the side, with the thighs (not shown) supported towards the knee joints (not shown) and the hips and knees (not shown) bent, allowing the legs (not shown) to spread outwardly in a supported manner while moving freely in the seat; and an adjustable, resiliently flexible front fastener 34, dimensioned and configured to provide extra support and posture control to the baby's torso while fastening the baby securely in the seat, by means of a hook-and-loop fastener 35, or so-called VELCRO.

The orthopedic baby seat 20 could be provided with at least one adjustable, resiliently flexible rear fastener 36, dimensioned and configured to set the width of the back support 26 and hence the lateral support and posture control to a baby's size, weight and/or physical proportions in the seat.

The orthopedic baby 20 is provided with securing formations (not shown) for securing the seat to a secondary structure (not shown). It is envisaged that the secondary structure (not shown) could comprise of equipment for use in holding, carrying, transporting, feeding and generally securing babies.

The flexible sheet material 27 comprises of an elastically flexible material in the form of a synthetic rubber, including polychloroprene, also known as Neoprene. It is envisaged that the flexible sheet material could be provided with breathing openings 37 to reduce heat buildup, sweating, shafing and the like.

The battens 29 are made of light metal. It is envisaged that the battens 29 can be made of any alternative material, including wood, fiberglass, vinyl or carbon fiber.

The back support 26 is provided with a padded upper edge formation 36, extending substantially along the upper edge of the support to provide protection to baby limbs, including its neck, arms and the like (not shown).

In this alternative embodiment, the orthopedic baby seat 20 is provided with a soft, front formation 37, without any battens, for safely enclosing the baby (not shown) therewith.

Figure 3:
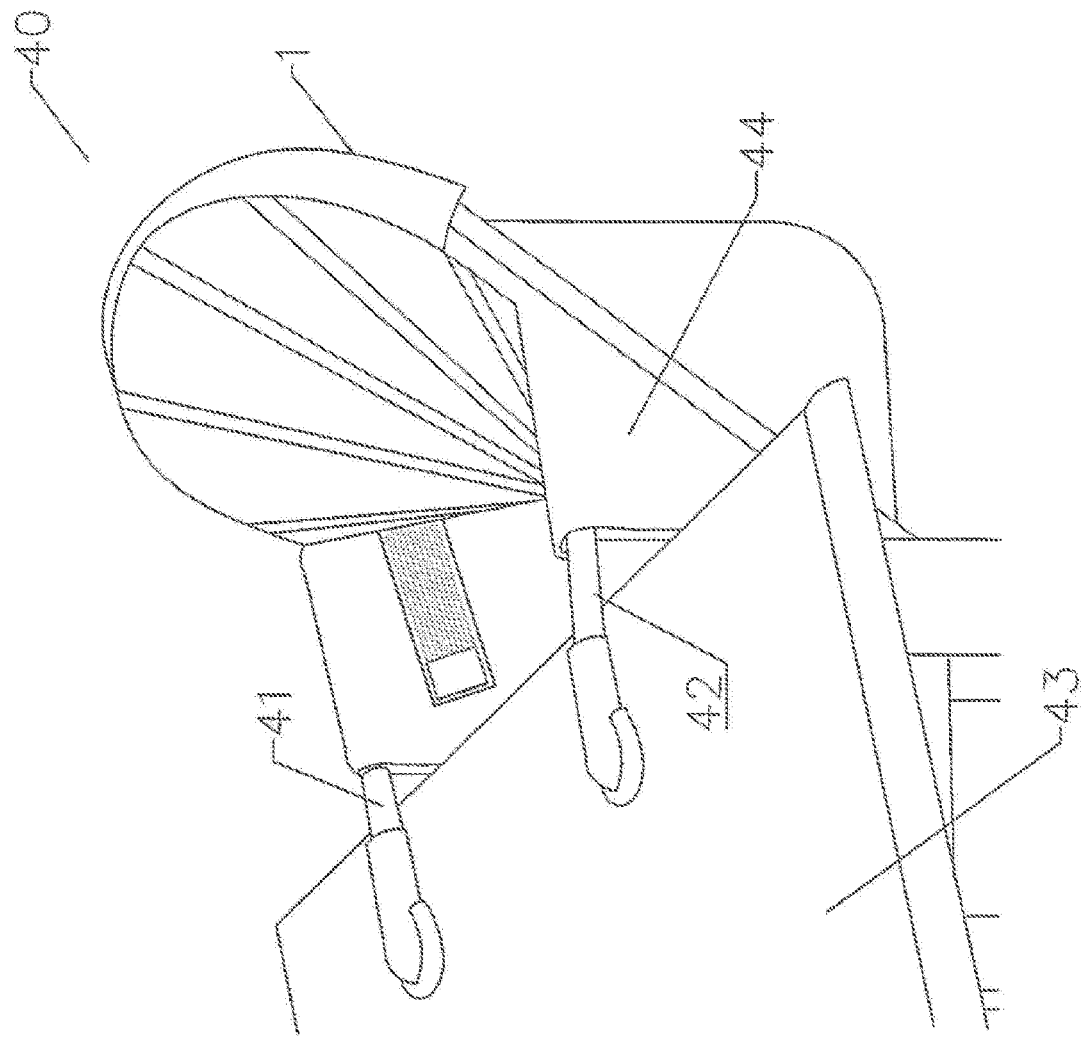
FIG. 3 is the orthopedic baby seat as illustrated in FIG. 1, secured to a baby clip-on chair, in accordance with the invention.

The baby seat 1 in accordance with the invention and as illustrated in FIG. 1 can be secured to equipment for use in holding, carrying, transporting, feeding or securing babies, including a clip-on chair 40, as illustrated in FIG. 3. The clip-on chair 40 includes the baby chair 1, and a clip-on frame, comprises two, releasably securing arms 41 and 42, configured and dimensioned to releasably secure the clip-on chair to an independent support structure, including a dining room table 43.

The orthopedic baby seat 1 is provided with securing formations 44 for securing the seat to securing arms 41 and 42.

Figure 4:
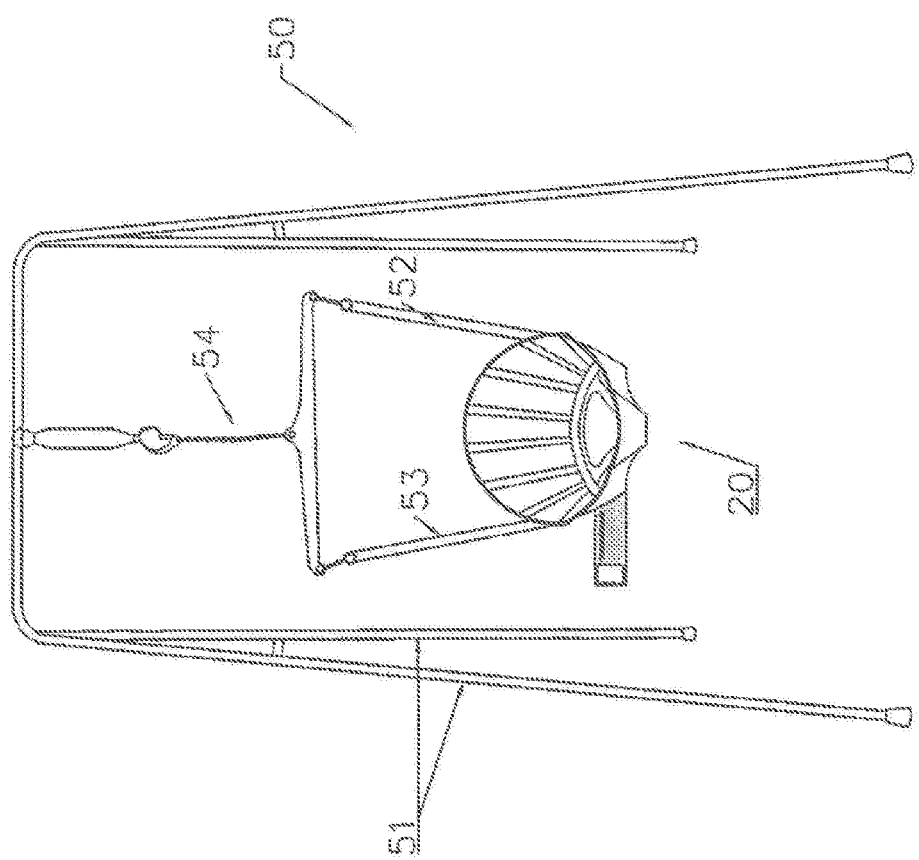
FIG. 4 is the orthopedic baby seat as illustrated in FIG. 2, secured to a baby jumper-swing arrangement, in accordance with the invention.

The baby seat 20 in accordance with the invention and as illustrated in FIG. 2 can be secured to equipment for use in holding, carrying, transporting, feeding or securing babies, including a jumper-swing arrangement 50, as illustrated in FIG. 4. The jumper-swing arrangement 50 includes the baby chair 20, and an independent support structure 51, comprises an A-frame.

The baby seat 20 is provided with securing formations 52, 53 and 54 for securing the seat to the A-frame.

Figure 5:
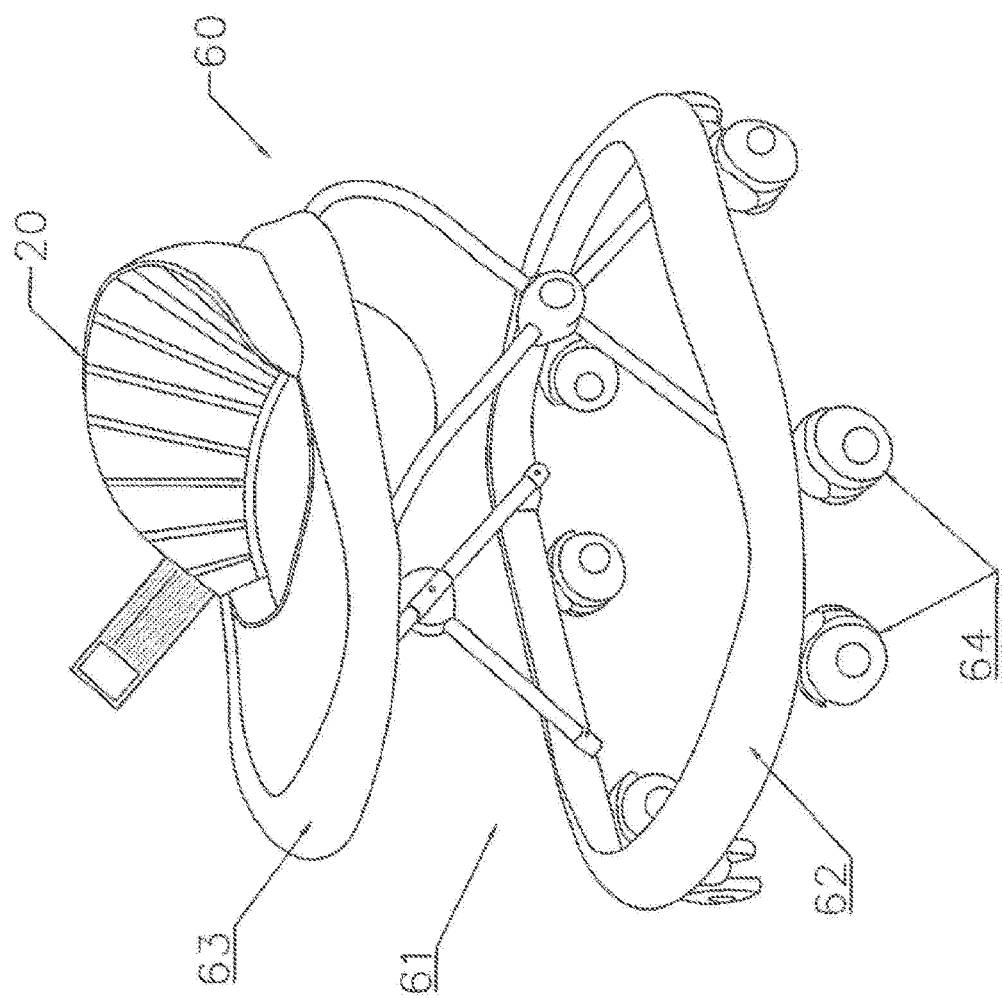
FIG. 5 is the orthopedic baby seat as illustrated in FIG. 2, secured to a baby walker, in accordance with the invention.

The baby seat 20 in accordance with the invention and as illustrated in FIG. 2 can also be secured to equipment for use in holding, carrying, transporting, feeding or securing babies, including a walking frame 60, as illustrated in FIG. 5. The walking frame 60 includes the baby chair 20, and an independent wheeled framework 61, comprises a primary framework 62, a secondary, elevated framework 63, for supporting the baby seat 20 securely thereon, and a set of casters 64, rollably secured to the primary framework.

The baby seat 20 is provided with securing formations (not shown) for securing the seat to the secondary framework 63.

It will be appreciated that many variations in detail are possible without departing from the scope and/or spirit of the inventions as defined in the consistory statements hereinabove and/or as claimed in the claims hereinafter.

The invention claimed is:
1. An orthopedic baby seat comprising:
   a relatively inflexible base, with a triangular planar cushion comprising a resiliently flexible support material, wherein the base with cushion tapers towards a front end of the base to provide a fish-tail shaped planar configuration, wherein the base with cushion is dimensioned and configured to receive and support a baby's bottom thereon;

a back support, adapted to extend upwardly from and at least partially around the base in a substantially C-formation to a height of at least a bottom of the baby's ribcage, with an opening of the C-formation directed towards the front end of the seat, wherein the back support comprises at least one layer of at least a partially flexible sheet material having a number of spaced, upwardly extending retaining formations, and a number of elongated battens, retained by the retaining formations and extending longitudinally upwardly from the base;

rendering the back support relatively rigid co-extensively with the battens and relatively flexible transversely to the battens to provide a substantially rigid support vertically and flexible support, laterally to the baby occupying the seat;

two opposing leg openings, extending outwardly from the base; and two opposed, cushioned thigh support formations, separating the base from the two leg openings, dimensioned and configured to allow hips of the baby to fall and spread naturally apart to the side, with thighs of the baby at least partially supported towards knee joints of the baby with his hips and knees bent, allowing legs of the baby to spread outwardly in a supported manner while moving relatively freely in the seat.

2. The orthopedic baby seat, as claimed in claim 1, further comprising at least one adjustable, resiliently flexible front fastener, dimensioned and configured to provide extra support and posture control to a baby's torso while fastening the baby securely in the seat, with due allowance for varying sizes, weights and physical proportions of the baby.

3. The orthopedic baby seat, as claimed in claim 2, further comprising a second opposing, adjustable, resiliently flexible front fastener, extending from an opposing end of the substantially C-formation and elevated from the base so as to provide support and posture control for the baby, as well as secure fastening to babies of varying sizes, weights and physical proportions in the seat.

4. The orthopedic baby seat, as claimed in claim 1, further comprising at least one adjustable, resiliently flexible rear fastener, dimensioned and configured to set the width of the back support and hence the lateral support and posture control to a baby's size, weight and physical proportions in the seat.

5. The orthopedic baby seat, as claimed in claim 1, further comprises securing formations for securing the seat to a secondary structure selected from the group consisting of baby harnesses, slings, carriers, wraps, pouches, jumpers, swings, rockers, bouncers, walkers, walking frames, seats, high chairs, clip-on chairs and car seats.

6. The orthopedic baby seat, as claimed in claim 5, wherein the secondary structure comprises equipment for use in holding, carrying, transporting, feeding and securing babies, wherein the equipment is selected from the group consisting of baby harnesses, slings, carriers, wraps, pouches, jumpers, swings, rockers, bouncers, walkers, walking frames, seats, high chairs, clip-on chairs, and car seats.

7. The orthopedic baby seat, as claimed in claim 1, wherein the back support further comprises two layers, at least one of which is comprised of a resiliently flexible sheet material.

8. The orthopedic baby seat, as claimed in claim 7, wherein the resiliently flexible sheet material comprises an elastically flexible material.

9. The orthopedic baby seat, as claimed in claim 8, wherein the elastically flexible material is selected from the group consisting of polychloroprene, closed-cell foamed Neoprene, FLA pediatric neoprene and flexible poly/cotton blends.

10. The orthopedic baby seat, as claimed in claim 7, wherein the flexible sheet material is provided with breathing openings to reduce heat buildup, sweating, and shafting.

11. The orthopedic baby seat, as claimed in claim 1, wherein the back support further comprises segments for additional ergonomic and deep pressure support.

12. Equipment for holding, carrying, transporting, feeding or and securing babies, wherein the equipment comprises the orthopedic baby seat, as claimed in claim 1.

13. The orthopedic baby seat, as claimed in claim 1, wherein the battens are made of materials selected from the group consisting of wood, fiberglass, vinyl, or carbon fiber, PVC, cast acrylic, nylon and light metal.

14. The orthopedic baby seat, as claimed in claim 1, wherein the back support further comprises a padded upper edge formation extending substantially along an upper edge of the support to provide protection to a baby's neck and arms.

* * * * *